United States Patent
Bowers

[11] Patent Number: 6,089,590
[45] Date of Patent: Jul. 18, 2000

[54] R.V. 5TH WHEEL HITCHING TARGET

[76] Inventor: Delwyn Bowers, 4279 Falcon St., P.O. Box 702438, West Valley City, Utah 84170

[21] Appl. No.: 09/271,089

[22] Filed: Mar. 17, 1999

[51] Int. Cl.$^7$ .................................................. B60D 13/00
[52] U.S. Cl. .............................................. 280/477; 33/264
[58] Field of Search ............................... 280/477, 417.1; 33/264; 116/28 R

[56] References Cited

U.S. PATENT DOCUMENTS

| | | | |
|---|---|---|---|
| D. 270,906 | 10/1983 | Orr | D12/16 |
| D. 421,238 | 2/2000 | Dinsky | D11/182 |
| 3,702,029 | 11/1972 | Anderson, Jr. | 33/246 AS |
| 3,818,599 | 6/1974 | Tague | 33/264 |
| 3,866,328 | 2/1975 | Alexander et al. | 33/264 |
| 3,901,536 | 8/1975 | Black | 280/477 |
| 4,034,480 | 7/1977 | Mehrtens | 33/264 |
| 4,627,634 | 12/1986 | Coleman | 280/477 |
| 5,036,593 | 8/1991 | Collier | 33/264 |
| 5,113,588 | 5/1992 | Walston | 33/264 |
| 5,655,474 | 8/1997 | Pretsch, Jr. | 116/28 R |
| 5,791,676 | 8/1998 | Jones | 280/477 |
| 6,024,372 | 2/2000 | Colibert et al. | 280/417.1 |

*Primary Examiner*—Paul N. Dickson
*Assistant Examiner*—Daniel Yeagley

[57] ABSTRACT

A visual alignment aid to assist in the proper alignment of a 5th wheel RV hitch to a 5th wheel trailer king pin when the view of the 5th wheel RV hitch is obstructed, due to extended cab length or other restrictions in the front portion of the bed area, such as but not limited to a tool box mounted in the front portion of a tow vehicle bed area.

1 Claim, 2 Drawing Sheets

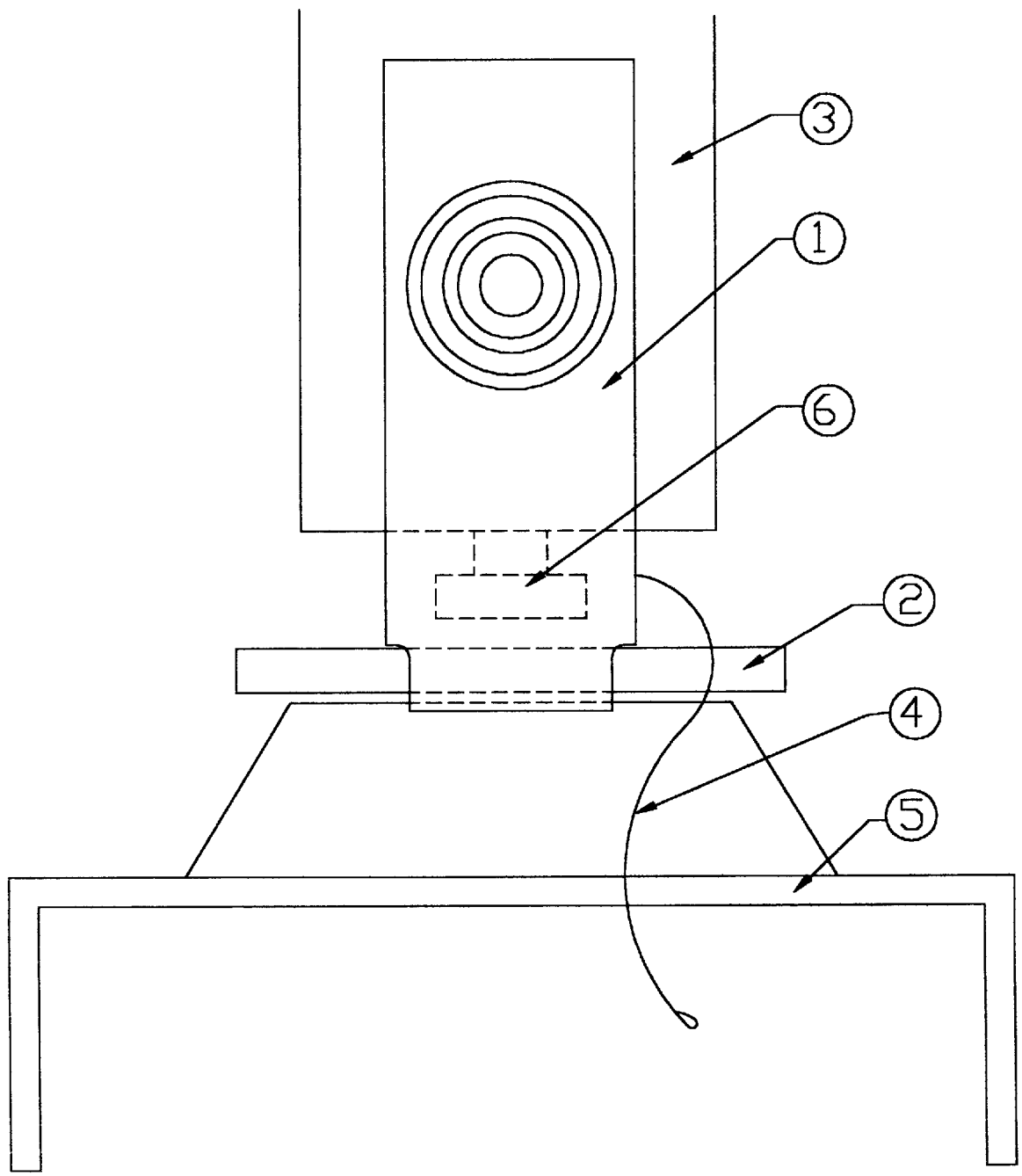
FIG. # 1

FIG. # 2
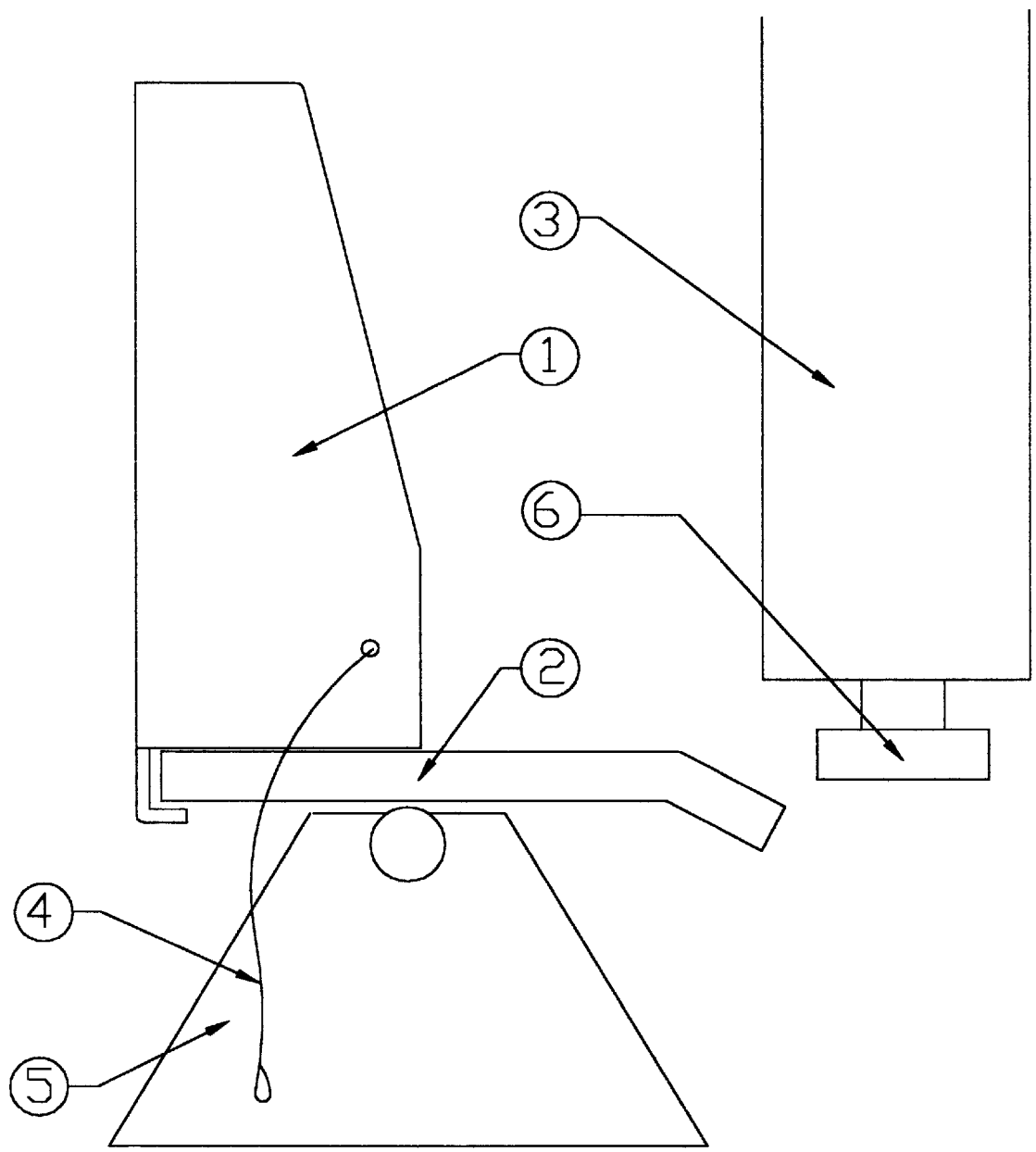

R.V. 5TH WHEEL HITCHING TARGET

BACKGROUND OF THE INVENTION

1. Field of the Invention

This invention relates to an apparatus to be referred to as the hitch target, which when placed on an RV 5th wheel plate enables the driver of the RV tow vehicle to properly align the RV 5th wheel plate in relationship to the 5th wheel trailer king pin for proper hitching when the view of the 5th wheel hitch plate is impaired due to obstructions in the bed of the vehicle or the vehicle length. After the hitching process is complete the 5th wheel trailer king pin housing will cause the hitch target to fall into the bed of the RV tow vehicle, to then be captured by using the retrieval cord. The retrieval cord is removably attached to a mounting pin on the 5th wheel assembly base for ease of access. The preferred construction of the target is metal, wood or plastic. The most preferred is a plastic material because of the durability in open weather conditions. The preferred fabrication of the hitching target would be an injection molding process, to the dimensions of approximately four inches wide by four inches deep by twelve inches high. The plastic material would be approximately ⅜ inch thick.

2. Description of Related Art

Current state of the art concerning the 5th wheel hitching does not take into consideration that some RV tow vehicles have no visual means to see the 5th wheel hitch plate due to obstructions in the front of the bed or due to the length of the vehicle. This visual sighting is necessary to properly align the 5th wheel plate with the 5th wheel trailer king pin.

My invention provides the mean to accurately align the 5th wheel plate to the 5th wheel trailer king pin by looking in the rear vision mirror of the tow vehicle, thereby giving an accurate view of said alignment.

Applicant is unaware of any related art apparatus or device that incorporates the features of this 5th wheel hitch targeting device. I find it to be an original idea.

SUMMARY OF THE INVENTION

This invention has been long needed by many RV 5th wheel owners because of the possibility of a number of visual restrictions. Such as, but not restricted to, extended cab length of tow vehicle and tool boxes mounted to the front of the bed of the tow vehicle. It has also been needed by those who have physical limitations that do not allow them to turn their head and look over there shoulder to view the alignment process. The 5th wheel hitch target will properly address this problem.

The use of this apparatus for alignment of an RV 5th wheel hitch and the 5th wheel trailer king pin provides for a means to accurately connect said vehicles.

The above description and examples should not be construed as limitations on the scope of the invention. Many other variations are possible.
Accordingly the scope of the invention is determined by the claims and their legal equivalents.

BRIEF DESCRIPTION OF THE DRAWINGS

FIG. 1 is the front view showing the hitch target and the 5th wheel trailer king pin housing.

FIG. 2 is the side view showing the hitch target and the 5th wheel plate and 5th wheel trailer king pin.

DETAILED DESCRIPTION OF THE INVENTION

One embodiment of the hitch target will be described by way of example. The description makes reference to the accompanying drawings, in which FIG. 1 is a front view of the hitch target and FIG. 2 is a side view of the hitch target. A prototype of the 5th wheel hitch target was constructed by the inventor and tested in his personal tow vehicle.

The mode of operation for the 5th wheel hitch target is as follows;
attach the retrieval cord (4) to a mounting pin on the 5th wheel base (5) then place the 5th wheel hitch target (1) on the forward lip of the 5th wheel plate as shown in FIG. 2. Then by simply looking in the rear vision mirror, in the RV tow vehicle, you are able to accurately align the 5th wheel plate (2) with the 5th wheel trailer king pin housing (3) then continue backing until the 5th wheel plate (2) and the 5th wheel trailer king pin (6) connect. When this happens the 5th wheel trailer king pin housing (3) will push the RV hitch target forward causing it to fall into the bed of the tow vehicle, wherein it can be recovered by using the retrieval cord (4) to be stored for future use.

What is claimed is:

1. An apparatus for the horizontal alignment of a RV 5th wheel hitch and a 5th wheel trailer king pin, providing an accurate visual aid for aligning the connection between vehicles, when a view through a RV tow vehicle rear vision mirror to a 5th wheel trailer is possible but the view of a 5th wheel hitch is restricted, due to cab length or other obstructions in the front portion of a tow vehicle bed area, the apparatus comprises:

(A). a target body detachably placed over a forward lip of a 5th wheel plate and extending rearward to position said target body on a top portion of said 5th wheel plate, said target body to be constructed from a material selected from wood, metal or plastic and approximately four inches wide by four inches deep by twelve inches tall enabling the target body to be visually seen from tow vehicle rear vision mirror to accurately align 5th wheel plate with said 5th wheel hitch;

(B). a retrieval cord fixably attached to the target body to be used for recovery of the target body after a successful hook-up is completed, wherein a 5th wheel trailer king pin housing will cause the target body to detach from said plate causing said body to fall into the bed of a RV tow vehicle, to be captured by using the retrieval cord.

* * * * *